United States Patent
Takahashi (10) Patent No.: US 9,609,162 B2
(45) Date of Patent: Mar. 28, 2017

(54) IMAGE READING APPARATUS AND IMAGE FORMING APPARATUS HAVING A GUIDE MEMBER

(71) Applicant: FUJI XEROX CO., LTD., Tokyo (JP)

(72) Inventor: Kaoru Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/841,992

(22) Filed: Sep. 1, 2015

(65) Prior Publication Data
US 2016/0295060 A1 Oct. 6, 2016

(30) Foreign Application Priority Data
Mar. 30, 2015 (JP) .................... 2015-068143

(51) Int. Cl.
*H04N 1/028* (2006.01)

(52) U.S. Cl.
CPC . *H04N 1/02815* (2013.01); *H04N 2201/0081* (2013.01); *H04N 2201/0091* (2013.01)

(58) Field of Classification Search
None
See application file for complete search history.

(56) References Cited

U.S. PATENT DOCUMENTS

2007/0059963 A1* 3/2007 Chen .................. B41J 19/20
439/298

FOREIGN PATENT DOCUMENTS

| JP | 2001346006 A | * | 12/2001 |
| JP | 2004-348074 A | | 12/2004 |
| JP | 2012-083515 A | | 4/2012 |
| JP | 2012-108424 A | | 6/2012 |

* cited by examiner

*Primary Examiner* — Barbara Reinier
(74) *Attorney, Agent, or Firm* — Oliff PLC (57) ABSTRACT

An image reading apparatus includes a movable body supported so as to be movable along a support table, the movable body supporting at least a light source; a controller that controls the light source; a connection member that electrically connects the movable body and the controller together, the connection member formed into a strip shape whose longitudinal direction extends in a direction in which the movable body moves and whose lateral direction extends in a widthwise direction, the connection member including a folded-back portion that is folded back in a direction opposite to the direction in which the movable body moves; and a guide member disposed along the connection member, the guide member having a high flexural rigidity in a portion that extends along the direction in which the movable body moves, the guide member having a low flexural rigidity in a portion corresponding to the folded-back portion.

5 Claims, 10 Drawing Sheets

FILM OF 0.1 mm × 40 mm

| CASE | (1) NO BEND | (2) ONE BEND | (3) THREE BENDS |
|---|---|---|---|
| CROSS SECTION OF FOLDED-BACK PORTION Q | I=33.3 | I=33.3 | I=33.3 |
| CROSS SECTION OF NON-FOLDED PORTION P | I=33.3 | 85° <br> I=2550 | 80° 80° <br> I=2550 |

IMAGE READING APPARATUS AND IMAGE FORMING APPARATUS HAVING A GUIDE MEMBER

CROSS-REFERENCE TO RELATED APPLICATIONS

This application is based on and claims priority under 35 USC 119 from Japanese Patent Application No. 2015-068143 filed Mar. 30, 2015.

BACKGROUND

Technical Field

The present invention relates to image reading apparatuses and image forming apparatuses.

SUMMARY

In order to address the above-described technical challenge, an image reading apparatus according to an aspect of the invention includes a movable body supported so as to be movable along a support table on which an original document is supported, the movable body supporting at least a light source; a controller that controls the light source; a connection member that electrically connects the movable body and the controller together, the connection member formed into a strip shape whose longitudinal direction extends in a direction in which the movable body moves and whose lateral direction extends in a widthwise direction that crosses the direction in which the movable body moves, the connection member including a folded-back portion that is folded back in a direction opposite to the direction in which the movable body moves; and a guide member disposed along the connection member, the guide member having a high flexural rigidity in a portion that extends along the direction in which the movable body moves, the guide member having a low flexural rigidity in a portion corresponding to the folded-back portion of the connection member.

BRIEF DESCRIPTION OF THE DRAWINGS

Exemplary embodiments of the present invention will be described in detail based on the following figures, wherein:

FIGS. 4A and 4B illustrate a connection member and a guide member according to the first exemplary embodiment, where

FIGS. 5A and 5B illustrate the guide member according to the first exemplary embodiment, where

FIGS. 6A and 6B illustrate a configuration that does not include a guide member, where

FIGS. 8A to 8C illustrate an image reading apparatus according to a second exemplary embodiment, where

FIGS. 9A and 9B illustrate modification examples of a guide member, where FIGS. 10A to 10C illustrate modification examples of a guide member and correspond to FIG. 5B, which is a cross-sectional view of the guide member according to the first exemplary embodiment, where

DETAILED DESCRIPTION

Referring now to the drawings, specific exemplary embodiments of the invention (hereinafter referred to as exemplary embodiments) are described. The invention, however, is not limited to the exemplary embodiments described below.

For ease of understanding of the following description, throughout the drawings, the frontward and rearward directions are expressed as an X-axis direction, the leftward and rightward directions are expressed as a Y-axis direction, and the upward and downward directions are expressed as a Z-axis direction. Directions or sides denoted by arrows X, −X, Y, −Y, Z, and −Z respectively indicate the frontward, rearward, rightward, leftward, upward, and downward directions or the front side, the rear side, the right side, the left side, the upper side, and the lower side.

In each of the drawings, an encircled dot denotes an arrow directing from the rear to the front of the drawing and an encircled cross denotes an arrow directing from the front to the rear of the drawing.

In the following description using the drawings, components other than those necessary for the description are appropriately omitted for ease of understanding.

First Exemplary Embodiment

Figure 1:
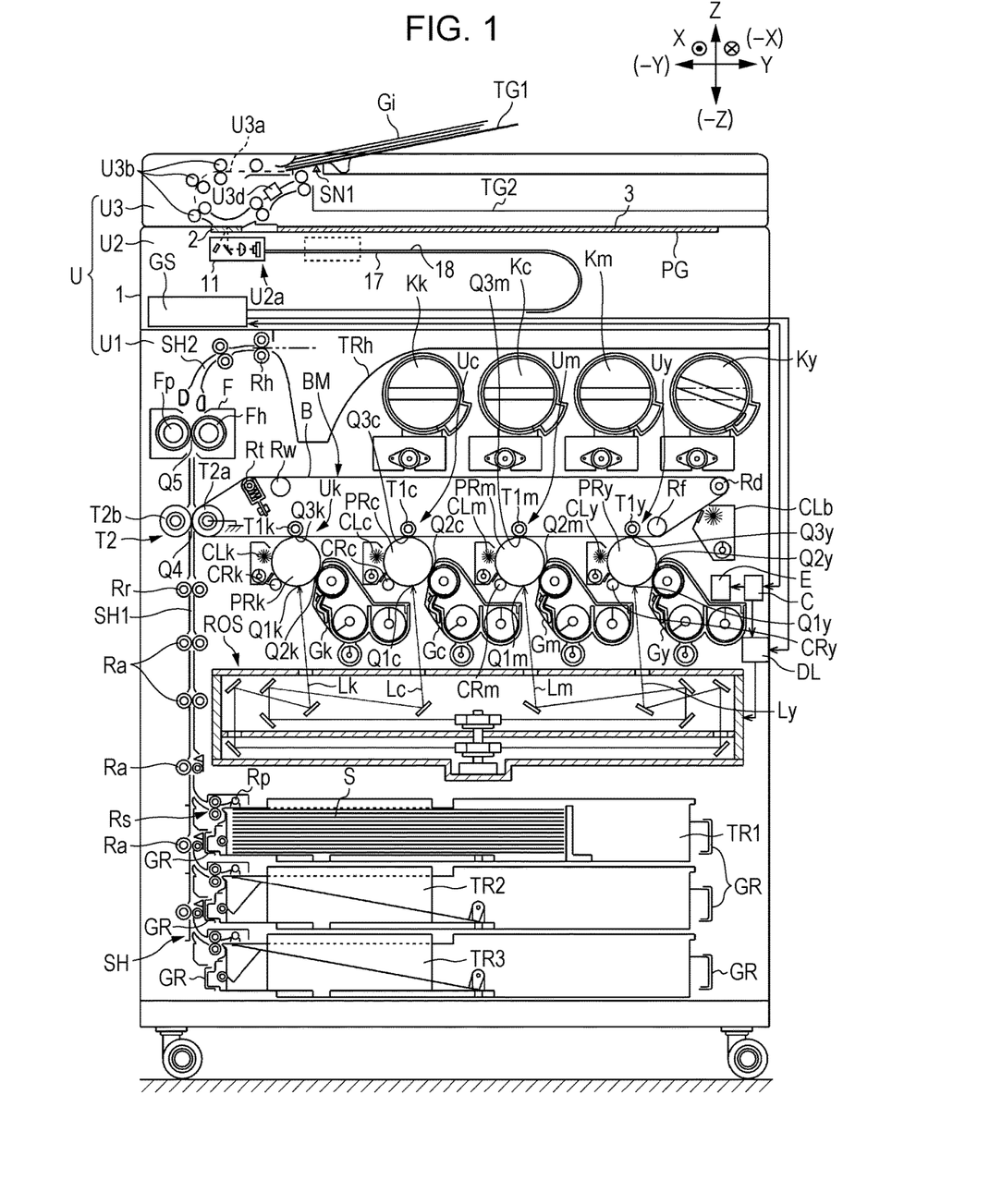
FIG. 1 is an overall view of an image forming apparatus according to a first exemplary embodiment.

FIG. 1 is an overall view of an image forming apparatus according to a first exemplary embodiment.

In FIG. 1, a copying machine U, serving as an example of an image forming apparatus according to a first exemplary embodiment of the invention, is an example of a recording unit and includes a printer unit U1, which is an example of an image recording apparatus. A scanner unit U2, which is an example of a reading portion and serves an example of an image reading device, is supported on the printer unit U1. An auto-feeder U3, which is an example of an original-document transporting device, is supported on the scanner unit U2. A user interface, which is an example of an input unit, is supported by the scanner unit U2 according to the first exemplary embodiment. The copying machine U is operable in response to an input made by an operator through the user interface.

An original-document tray TG1, which is an example of a medium container, is disposed on the auto-feeder U3. The original-document tray TG1 is capable of holding a pile of multiple original documents Gi that are to be copied. An original-document output tray TG2, which is an example of an original-document ejection portion, is disposed below the original-document tray TG1. Original-document transport rollers U3b are disposed along an original-document transport path U3a between the original-document tray TG1 and the original-document output tray TG2.

A platen glass PG, which is an example of a transparent original-document table, is disposed on the upper surface of the scanner unit U2. In the scanner unit U2 according to the first exemplary embodiment, a reading unit U2a, which is an example of a reading portion, is disposed below the platen glass PG. The reading unit U2a according to the first exemplary embodiment is supported along the undersurface of the platen glass PG so as to be movable in the leftward and rightward directions, which are examples of a sub-scanning direction. Normally, the reading unit U2a is stationary at an initial position expressed by a solid line in FIG. 1. The reading unit U2a is electrically connected to an image processor GS.

In the auto-feeder U3 according to the first exemplary embodiment, a reading sensor U3d, which is an example of a second reading member, is disposed on the original-document transport path U3a at a position downstream, in the direction in which an original document is transported, of a portion that the reading unit U2a faces. The reading sensor U3d is capable of reading a surface of an original document GI opposite to the surface of the original document Gi read by the reading unit U2a.

Figure 2:
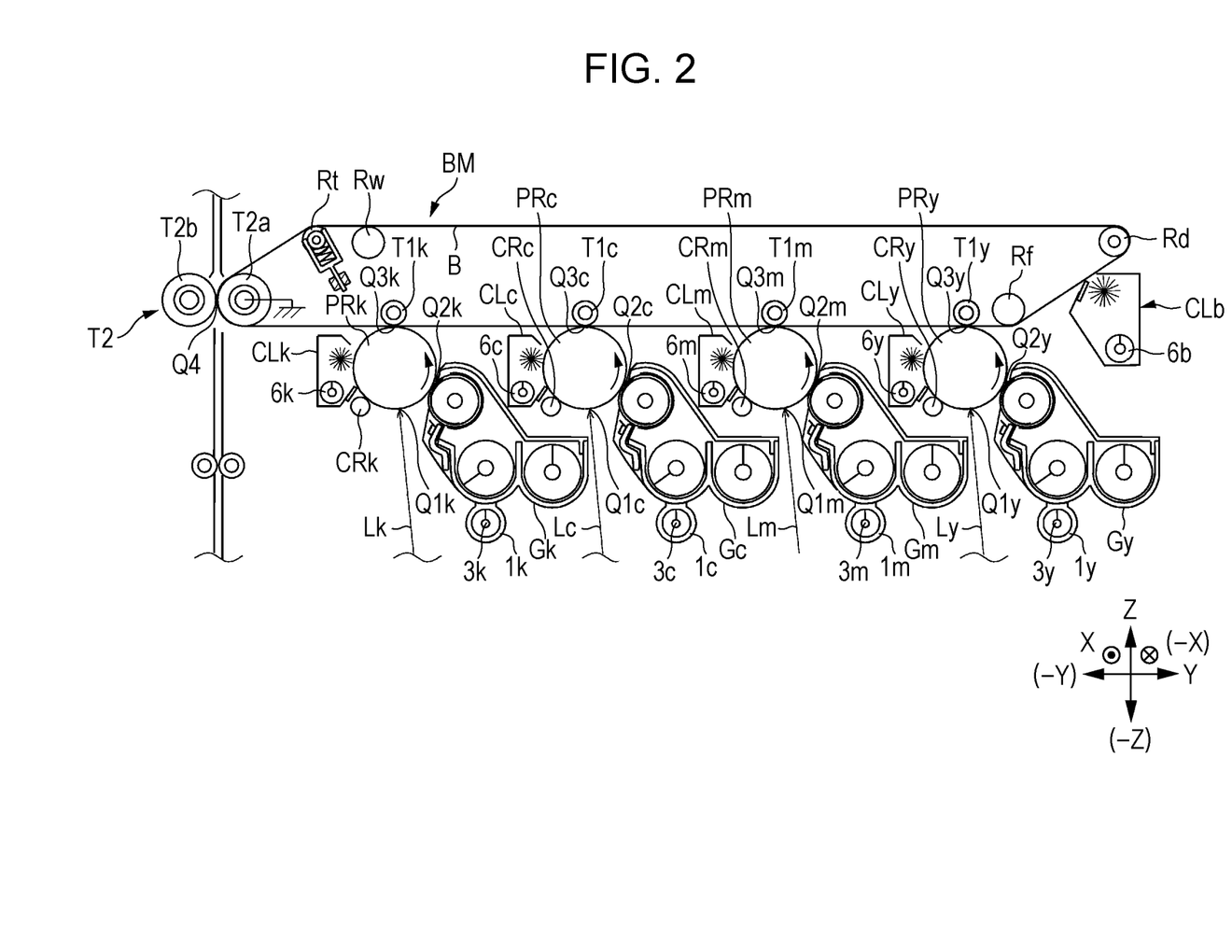
FIG. 2 illustrates a characteristic portion of an image recording unit according to the first exemplary embodiment.

FIG. 2 illustrates a characteristic portion of an image recording unit according to the first exemplary embodiment.

The image processor GS is electrically connected to a write circuit DL of the printer unit U1. The write circuit DL is electrically connected to an exposure device ROS, which is an example of a latent-image forming device.

The exposure device ROS according to the first exemplary embodiment is capable of emitting laser beams Ly, Lm, Lc, and Lk respectively corresponding to yellow (Y), magenta (M), cyan (C), and black (K) colors and serving as examples of write light beams. The exposure device ROS is capable of emitting laser beams Ly to Lk corresponding to signals received from the write circuit DL.

In FIG. 1, photoconductors PRy, PRm, PRc, and PRk, which are examples of image carriers, are disposed above the exposure device ROS. In FIG. 1 and FIG. 2, the areas of the photoconductors PRy to PRk irradiated with the corresponding laser beams Ly to Lk respectively constitute write areas Q1y, Q1m, Q1c, and Q1k.

Charging rollers CRy, CRm, CRc, and CRk, which are examples of charging devices, are disposed upstream of the corresponding write areas Q1y to Q1k in the direction in which the photoconductors PRy, PRm, PRc, and PRk rotate. The charging rollers CRy to CRk according to the first exemplary embodiment are supported so as to be allowed to rotate after coming into contact with the respective photoconductors PRy to PRk.

Developing devices Gy, Gm, Gc, and Gk are disposed downstream of the corresponding write areas Q1y to Q1k in the direction in which the photoconductors PRy to PRk rotate. The areas over which the photoconductors PRy to PRk face the corresponding developing devices Gy to Gk respectively constitute development areas Q2y, Q2m, Q2c, and Q2k.

First transfer, rollers T1y, T1m, T1c, and T1k, which are examples of first transfer devices, are disposed downstream of the corresponding developing devices Gy to Gk in the direction in which the photoconductors PRy to PRk rotate. The areas over which the photoconductors PRy to PRk face the corresponding first transfer rollers T1y to T1k respectively constitute first transfer areas Q3y, Q3m, Q3c, and Q3k.

Photoconductor cleaners CLy, CLm, CLc, and CLk, which are examples of image carrier cleaners, are disposed downstream of the corresponding first transfer rollers T1y to T1k in the direction in which the photoconductors PRy to PRk rotate.

The Y-color photoconductor PRy, the charging roller CRy, the exposure device ROS that emits a laser beam Ly of the Y color, the developing device Gy, the first transfer roller T1y, and a photoconductor cleaner CLy constitute a Y-color image forming unit Uy, which is an example of a Y-color visible image forming apparatus according to the first exemplary embodiment that forms a toner image, which is an example of a visible image. Similarly, each of the photoconductors PRm, PRc, and PRk, the corresponding one of the charging rollers CRm, CRc, and CRk, the exposure device ROS, the corresponding one of the developing devices Gm, Gc, and Gk, the corresponding one of the first transfer rollers T1m, T1c, and T1k, and the corresponding one of the photoconductor cleaners CLm, CLc, and CLk constitute a M-color, C-color, or K-color image forming unit Um, Uc, or Uk.

A belt module BM, which is an example of an intermediate transfer device, is disposed above the photoconductors PRy to PRk. The belt module BM includes an intermediate transfer belt B, which is an example of an intermediate transfer body. The intermediate transfer belt B is constituted of an endless member.

The intermediate transfer belt B according to the first exemplary embodiment is rotatably supported by a belt driving roller Rd, which is an example of a driving member, a tension roller Rt, which is an example of a tensioning member, a walking roller Rw, which is an example of a member that compensates for deviation, an idler roller Rf, which is an example of a driven member, a backup roller T2a, which is an example of a member facing a second transfer area, and first transfer rollers T1y, T1m, T1c, and T1k.

A second transfer roller T2b, which is an example of a second transfer member, is disposed at such a position as to face the backup roller T2a with the intermediate transfer belt B interposed therebetween. In the first exemplary embodiment, the backup roller T2a is grounded. A power circuit E applies, to the second transfer roller T2b, a second transfer voltage having a polarity opposite to the polarity with which toner is electrically charged. The backup roller T2a and the second transfer roller T2b constitute a second transfer device T2 according to the first exemplary embodiment. The area over which the second transfer roller T2b comes into contact with the intermediate transfer belt B constitutes a second transfer area Q4.

A belt cleaner CLb, which is an example of a cleaner that cleans the intermediate transfer body, is disposed downstream of the second transfer area Q4 in the direction in which the intermediate transfer belt B rotates.

Components including the first transfer rollers T1y to T1k, the intermediate transfer belt B, and the second transfer device T2 constitute a transfer device according to the first exemplary embodiment. The image forming units Uy to Uk and the transfer device constitute an image recording unit according to the first exemplary embodiment.

In FIG. 1, three pairs of right and left guide rails GR, which are examples of guide members, are disposed at different levels below the image forming units Uy to Uk. Each pair of guide rails GR support one of paper feed trays TR1 to TR3, which are examples of medium containers, in such a manner as to allow the paper feed tray to be insertable and removable frontward and rearward. The paper feed trays TR1 to TR3 hold recording sheets S, which are examples of media.

A pickup roller Rp, which is an example of a pickup member, is disposed at the upper right of each of the paper feed trays TR1 to TR3. Separation rollers Rs, which are examples of separation members, are disposed downstream of each pickup roller Rp in the direction in which a recording sheet S is transported. A paper feed path SH1, which extends upward and which is an example of a medium transport path, is formed downstream of the separation rollers Rs in the direction in which a recording sheet S is transported. Multiple transport rollers Ra, which are examples of transport members, are disposed on the paper feed path SH1.

Registration rollers Rr, which are examples of members that adjust timing of sheet transport, are disposed on the paper feed path SH1 at positions upstream of the second transfer area Q4.

A fixing device F is disposed downstream of the second transfer area Q4 in the direction in which a sheet S is transported. The fixing device F includes a heating roller Fh, which is an example of a member for fixing an image by heating, and a pressing roller Fp, which is an example of a member for fixing an image by pressing. The area over which the heating roller Fh and the pressing roller Fp come into contact with each other constitutes a fixing area Q5.

A paper ejection path SH2, which is an example of a transport path, is disposed above the fixing device F. A paper output tray TRh, which is an example of a medium output portion, is formed on the upper surface of the printer unit U1. The paper ejection path SH2 extends toward the paper output tray TRh. Ejection rollers Rh, which are examples of medium transport members, are disposed at a downstream end portion of the paper ejection path SH2.

Description of Image Forming Operation

When the copying machine U according to the first exemplary embodiment having the above-described configuration copies an original document Gi manually placed on the platen glass PG by an operator, the reading unit U2a moves leftward and rightward from the initial position to scan the original document Gi on the platen glass PG while reading unit U2a shines light to the original document Gi. When the copying machine U copies an original document Gi while automatically transporting the original document Gi using the auto-feeder U3, the reading unit U2a moves from the initial position to an original-document reading position, drawn with the broken line in FIG. 1, and stops at the original-document reading position. Multiple original documents Gi contained in the original-document tray TG1 are sequentially transported to the original-document reading position on the platen glass PG, pass through the original-document reading position, and are then ejected to the original-document output tray TG2. Thus, the original documents Gi that sequentially pass through the reading position on the platen glass PG are exposed to light and scanned by the reading unit U2a that remains stationary. The light reflected off the original documents Gi is received by the reading unit U2a. The reading unit U2a converts the received light that has been reflected off the original documents Gi into electric signals. In the case where both sides of an original document Gi are to be read, the reading sensor U3d also reads the original document Gi.

Electric signals output from the reading unit U2a are input to the image processor GS. The image processor GS converts electric signals of an image having read, green, and blue (RGB) colors read by the reading unit U2a into image data of yellow (Y), magenta (M), cyan (C), and black (K) for forming latent images. The image processor GS outputs the image data obtained after the conversion to the write circuit DL of the printer unit U1. In the case where the image is a single-color image or a monochromatic image, the image processor GS outputs image data of only black (K) to the write circuit DL.

The write circuit DL outputs control signals corresponding to the input image data to the exposure device ROS. The exposure device ROS outputs laser beams Ly to Lk corresponding to the control signals.

When an image forming operation is started, the photoconductors PRy to PRk are driven to rotate. The power circuit E applies charging voltages to the charging rollers CRy to CRk. Thus, the surfaces of the photoconductors PRy to PRk are electrically charged by the charging rollers CRy to CRk. In the write areas Q1y to Q1k, electrostatic latent images are formed by the laser beams Ly to Lk on the surfaces of the electrically charged photoconductors PRy to PRk. In the development areas Q2y to Q2k, the electrostatic latent images on the photoconductors PRy to PRk are developed by the developing devices Gy, Gm, Gc, and Gk into toner images, which are examples of visible images.

The toner images obtained after the development are transported to the first transfer areas Q3y, Q3m, Q3c, and Q3k in which the toner images touch the intermediate transfer belt B, which is an example of an intermediate transfer body. In the first transfer areas Q3y, Q3m, Q3c, and Q3k, the power circuit E applies first transfer voltages, having a polarity opposite to the polarity with which toner is electrically charged, to the first transfer rollers T1y to T1k. Thus, the toner images on the photoconductors PRy to PRk are transferred to the intermediate transfer belt B by the first transfer rollers T1y to T1k. In the case of forming a multi-color toner image, a toner image disposed downstream is transferred so as to be superposed on a toner image that has been transferred to the intermediate transfer belt B in an upstream first transfer area.

Remnants or adherents remaining on the photoconductors PRy to PRk after the first transfer are removed by the photoconductor cleaners CLy to CLk. The cleaned surfaces of the photoconductors PRy to PRk are recharged by the charging rollers CRy to CRk.

A single-color or multi-color toner image that has been transferred to the intermediate transfer belt B by the first transfer roller T1k or the first transfer rollers T1y to T1k in the first transfer area Q3k or the first transfer areas Q3y to Q3k is transported to the second transfer area Q4.

Sheets S on which images are to be recorded are picked up by the pickup roller Rp on one of the paper feed trays TR1 to TR3 that is to be used. When multiple sheets S are collectively picked up by the pickup roller Rp, the sheets S are separated by the separation rollers Rs from one another. Each sheet S separated by the separation rollers Rs is transported along the paper feed path SH1 by the transport rollers Ra. The sheet S that has been transported along the paper feed path SH1 is fed to the registration rollers Rr.

The registration rollers Rr transport the sheet S to the second transfer area Q4 at the same time when the toner image formed on the intermediate transfer belt B is transported to the second transfer area Q4. The power circuit E applies a second transfer voltage, having a polarity opposite to the polarity with which toner is electrically charged, to the second transfer roller T2b. Thus, the toner image on the intermediate transfer belt B is transferred from the intermediate transfer belt B to the sheet S.

Adherents or other matter adhering to the surface of the intermediate transfer belt B after the second transfer are removed by the belt cleaner CLb.

When the recording sheet S to which the toner image has been second transferred passes through the fixing area Q5, the toner image is heated and fixed to the recording sheet S.

The recording sheet S to which the image has been fixed is transported along the paper ejection path SH2. The sheet S that has been transported along the paper ejection path SH2 is ejected to the paper output tray TRh by the ejection rollers Rh.

Description on Image Reading Apparatus

Figure 3:
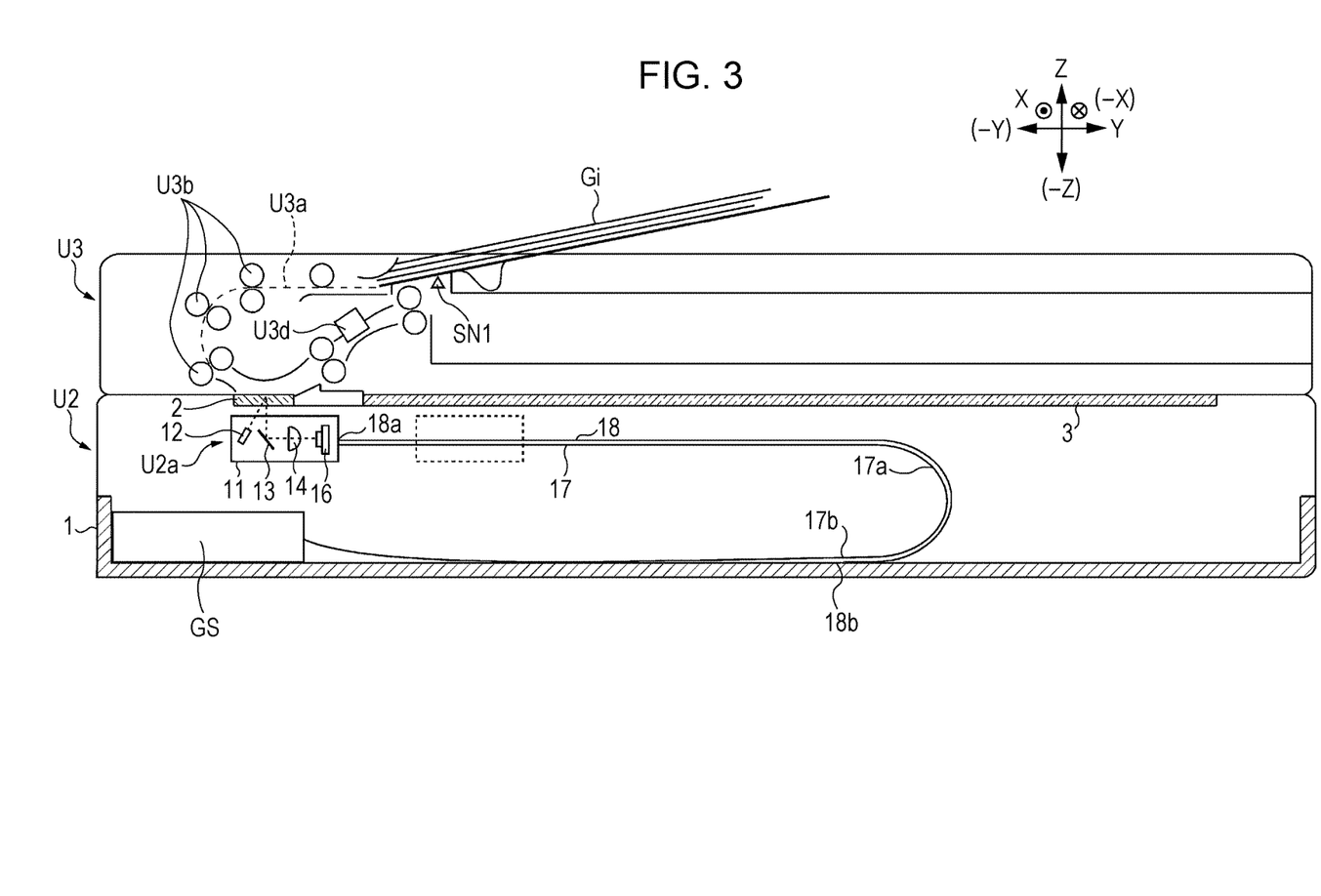
FIG. 3 illustrates an image reading apparatus according to the first exemplary embodiment.

FIG. 3 illustrates an image reading apparatus according to the first exemplary embodiment.

In FIG. 3, the scanner unit U2, which is an example of the image reading apparatus, includes a casing 1, which is an example of a housing. The platen glass PG is supported by the upper surface of the casing 1. The platen glass PG according to the first exemplary embodiment includes an automatic reading glass 2, disposed to the left, and a manual reading glass 3, disposed to the right.

In FIG. 1 and FIG. 3, the reading unit U2a is disposed below the platen glass PG.

The reading unit U2a according to the first exemplary embodiment includes a carriage 11, which is an example of a movable member. The carriage 11 is supported so as to be allowed to move rightward and leftward along the undersurface of the platen glass PG by a driving system, not illustrated. The carriage 11 supports a lamp 12, which is an example of a light source, a mirror 13 and a lens 14, which are examples of optical systems, and an image pickup device 16, which is an example of a reading member.

Figure 4A:
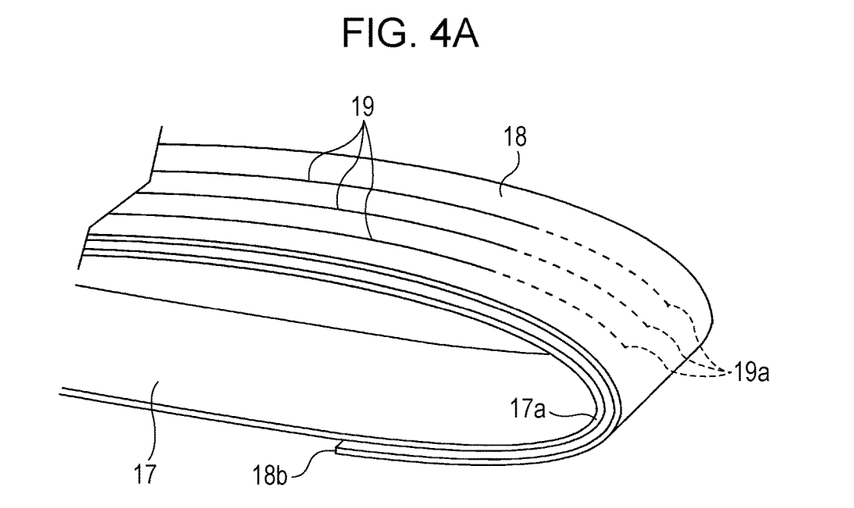
FIG. 4A is a perspective view of a folded-back portion and FIG. 4B is an exploded view of the connection member and the guide member.
Figure 4B:
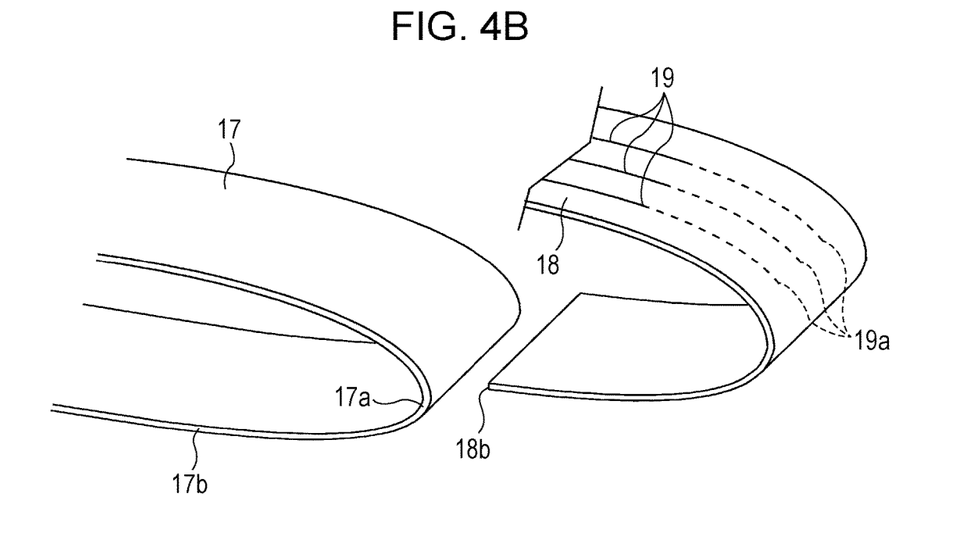

FIGS. 4A and 4B illustrate a connection member and a guide member according to the first exemplary embodiment, where FIG. 4A is a perspective view of a folded-back portion and FIG. 4B is an exploded view of the connection member and the guide member.

As illustrated in FIG. 3, the carriage 11 and the image processor GS, which is an example of a controller, are connected together using a flexible flat cable 17, which is an example of a connection member. Hereinbelow, the flexible flat cable is abbreviated to a "FFC".

In FIGS. 3, 4A, and 4B, a FFC 17 according to the first exemplary embodiment has a strip shape whose longitudinal direction extends leftward and rightward and whose lateral direction extends frontward and backward. The FFC 17 has one end connected to the carriage 11 and the other end connected to the image processor GS. The FFC 17 has a folded-back portion 17a, which is bent into an arc shape, to the right.

The FFC 17 according to the first exemplary embodiment is capable of supplying control signals or power to the lamp 12 or the image pickup device 16 in the carriage 11 or transmitting image data read by the image pickup device 16 to the image processor GS. The FFC 17 according to the first exemplary embodiment may be a commercially available FFC. Alternatively, the FFC 17 may be a particular FFC having one surface or both surfaces subjected to shielding as a measure against electromagnetic interference (EMI).

Figure 5A:
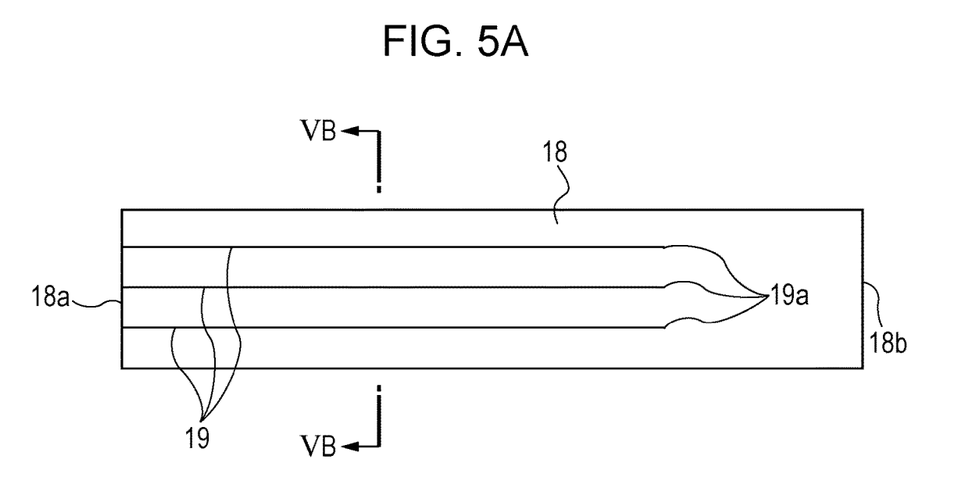
FIG. 5A is an expansion plan of the guide member and FIG. 5B is a cross-sectional view of the guide member taken along the line VB-VB of FIG. 5A.
Figure 5B:
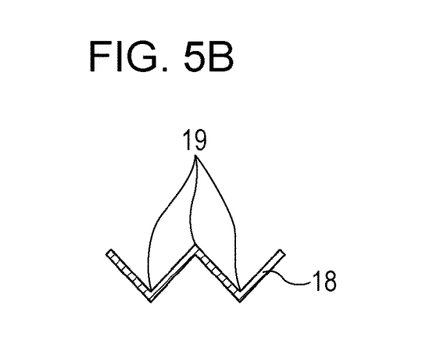

FIGS. 5A and 5B illustrate the guide member according to the first exemplary embodiment, where FIG. 5A is an expansion plan of the guide member and FIG. 5B is a cross-sectional view of the guide member taken along the line VB-VB of FIG. 5A.

In FIGS. 3, 4A, and 4B, a film 18, which is an example of a guide member, is supported on the outer side of the FFC 17. The film 18 has a first end 18a supported by the FFC 17 at a position near the carriage 11. In FIG. 4, a second end 18b of the film 18 is supported at a portion of the FFC 17 corresponding to the lower end 17b of the folded-back portion 17a of the FFC 17 in the state where the carriage 11 is located at the left end.

In FIGS. 4A, 4B, 5A, and 5B, the film 18 according to the first exemplary embodiment has bends 19, at which the film 18 is bent with respect to the width direction. The film 18 according to the first exemplary embodiment has three bends 19 and is formed so as to have a "W-shaped" cross section, as illustrated in FIG. 5B.

According to the first exemplary embodiment, a second end 19a of each bend 19 does not extend up to the second end 18b of the film 18. As illustrated with the broken line in FIGS. 4A and 4B, each bend 19 is formed only up to substantially the middle of the arc-shaped folded-back portion 17a in the state where the carriage 11 is located at the left end.

The film 18 according to the first exemplary embodiment is made of polyethylene terephthalate (PET), as an example of an elastic material. Thus, the bends 19 are allowed to be easily formed in the film 18 by molding or performing processing and the formed bends 19 are maintained for a long time. The portion of the film 18 over the folded-back portion 17a receives a force that bends the film 18 along the shape of the folded-back portion 17a and expands in the width direction. Specifically, the bends 19 are unbent and the film 18 becomes flat in the width direction.

Function of Image Reading Device According to First Exemplary Embodiment

When the auto-feeder U3 is used in the scanner unit U2 according to the first exemplary embodiment having the above-described configuration, the carriage 11 moves to an automatic read position to the left end, indicated by a solid line in FIG. 4. Then, the image pickup device 16 reads an original document Gi that passes over the automatic reading glass 2. When an original document Gi placed on the upper surface of the manual reading glass 3 is to be read, the carriage 11 moves from a manual read start position, indicated by the broken line in FIG. 4, to the right end, that is, scans the original document Gi. Then, the image pickup device 16 in the carriage 11 that is in scanning reads the original document Gi placed on the manual reading glass 3.

Figure 6A:
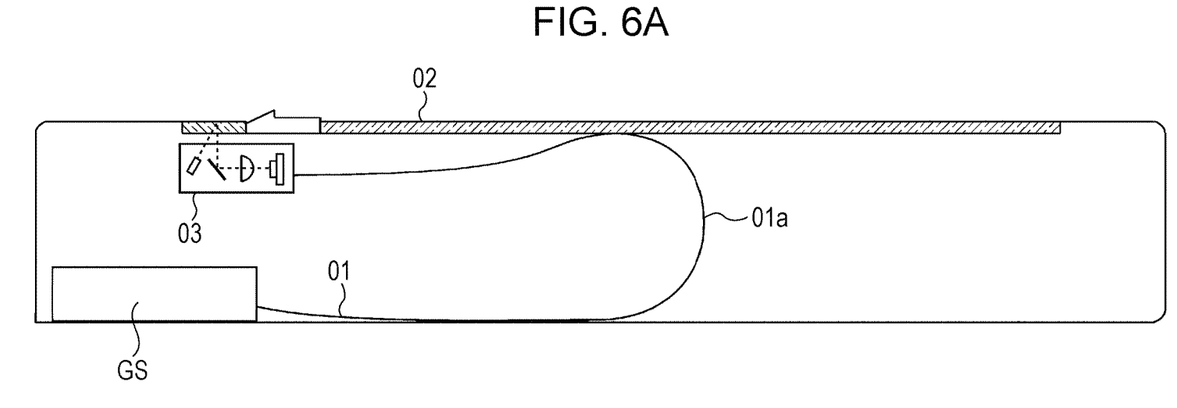
FIG. 6A illustrates the connection member that is in the state of touching an original-document table and FIG. 6B illustrates the connection member that is in the buckled state.
Figure 6B:
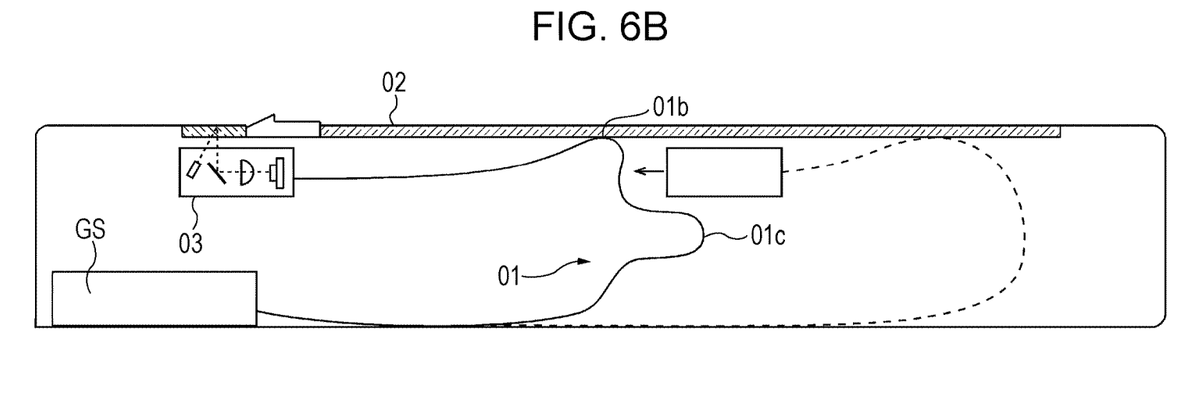

FIGS. 6A and 6B illustrate a configuration that does not include a guide member, where FIG. 6A illustrates the connection member that is in the state of touching an original-document table and FIG. 6B illustrates the connection member that is in the buckled state.

Here, while the carriage 11 is moving, the FFC 17 moves while shifting the folded-back portion 17a. If the configuration does not include the film 18, a folded-back portion 01a of a FFC 01 expands upward, as illustrated in FIG. 6A, and rubs against the undersurface of a platen glass 02. Accordingly, the platen glass 02 gets dirty over time and is thus subjected to adverse effects such as intrusion of a dirt image onto the read image. In addition, as illustrated in FIG. 6B, while a carriage 03 is moving, a middle portion 01c of the FFC 01 may be buckled if a contact portion 01b of the FFC 01 becomes stuck on the platen glass PG due to the frictional force resulting from the contact between the platen glass 02 and the FFC 01. Buckling of the FFC 01 may cause damages on internal signal lines, possibly causing communication failures or power supply failures.

Figure 7:
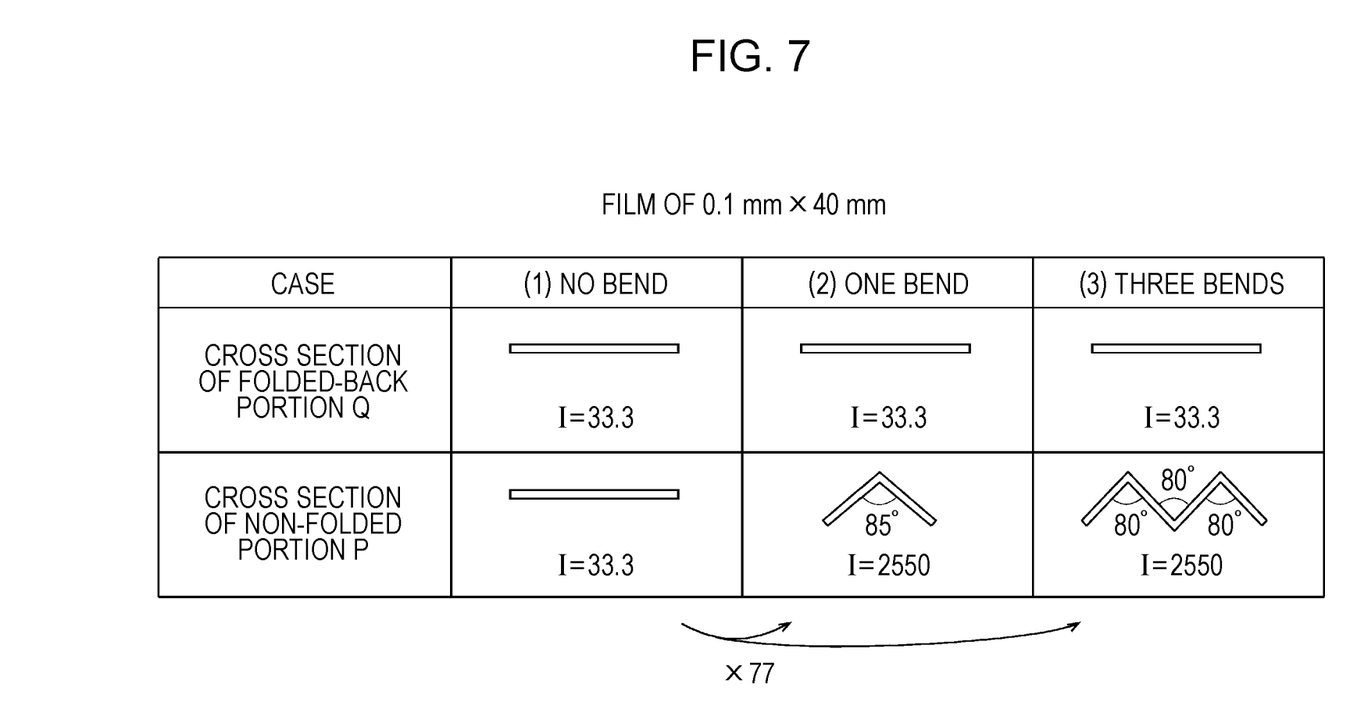
FIG. 7 illustrates the flexural rigidity of the image forming apparatus according to the first exemplary embodiment.

FIG. 7 illustrates the flexural rigidity of the image forming apparatus according to the first exemplary embodiment.

The flexural rigidity is expressed as E·I where the Young's modulus is denoted by E and the second moment of area is denoted by I. Here, the Young's modulus E varies from material to material and the second moment of area I varies from shape to shape. As illustrated in FIG. 7, in the configuration that does not include the bends 19, the second moment of area I of a flat board shape having a thickness of 0.1 mm and a width of 40 mm is 33.3. The portion of the film 18 flattened so as to follow the shape of the folded-back portion 17a has a second moment of area I of 33.3.

On the other hand, the portion of the film 18 in which the bend or bends 19 remains/remain unbent has a second moment of area I of 2550 when the portion has three bends 19 forming an angle of 80 degrees or one bend 19 forming an angle of 85 degrees, as illustrated in FIG. 7. Thus, the portion of the film 18 having at least one bend 19 has a flexural rigidity E·I that is approximately 77 times higher than the flexural rigidity of the portion of the film 18 having no bend 19.

In the first exemplary embodiment, the film 18 including the bends 19 and having a high flexural rigidity holds the folded-back portion 17a of the FFC 17 against the force that expands the folded-back portion 17a upward. Thus, the FFC 17 is prevented from expanding upward and touching the platen glass PG.

Second Exemplary Embodiment

Figure 8A:
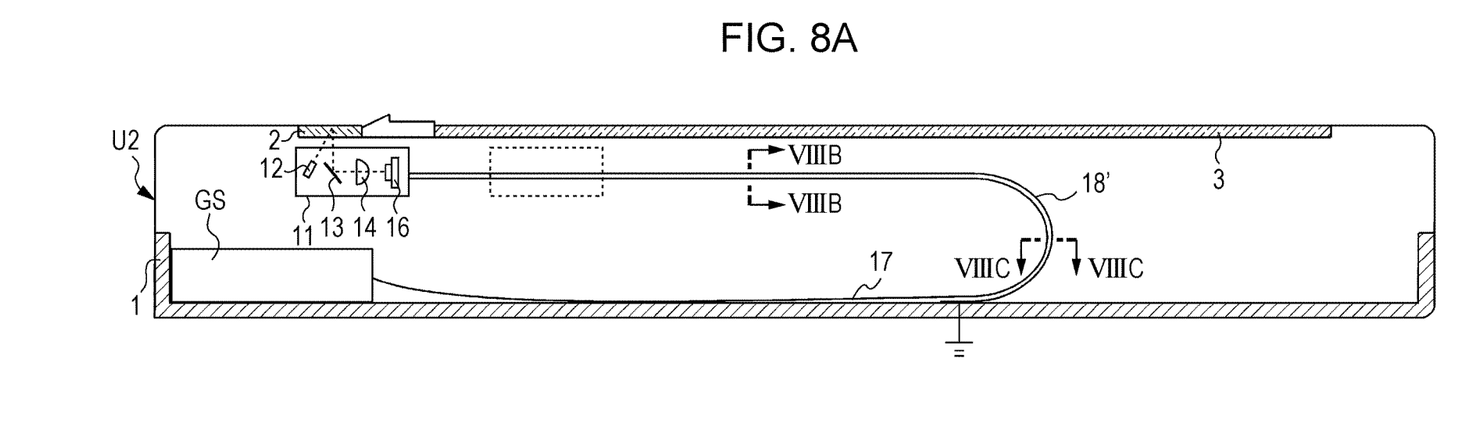
FIG. 8A is the drawing corresponding to FIG. 3 that illustrates the image reading apparatus according to the first exemplary embodiment.
Figure 8B:
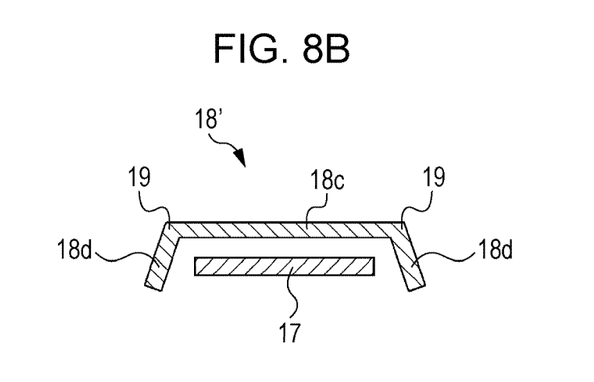
FIG. 8B is a cross-sectional view of the image reading apparatus taken along the line VIIIB-VIIIB of FIG. 8A.
Figure 8C:
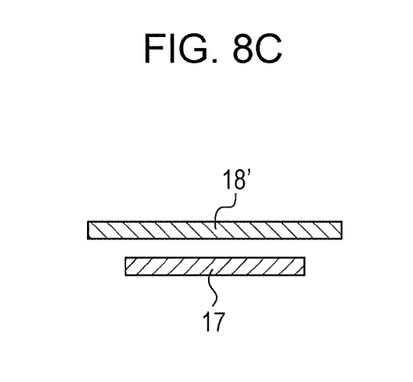
FIG. 8C is a cross-sectional view of the image reading apparatus taken along the line VIIIC-VIIIC of FIG. 8A.

FIGS. 8A to 8C illustrate an image reading apparatus according to a second exemplary embodiment, where FIG. 8A is the drawing corresponding to FIG. 3 that illustrates the image reading apparatus according to the first exemplary embodiment, FIG. 8B is a cross-sectional view of the image reading apparatus taken along the line VIIIB-VIIIB of FIG. 8A, and FIG. 8C is a cross-sectional view of the image reading apparatus taken along the line VIIIC-VIIIC of FIG. 8A.

Now a second exemplary embodiment of the invention is described. In the description of the second exemplary embodiment, components corresponding to the components according to the first exemplary embodiment are denoted by the same reference symbols and not described in detail.

Except the points described below, the configuration of the second exemplary embodiment is substantially the same as that of the first exemplary embodiment.

In FIG. 8, the scanner unit U2 according to the second exemplary embodiment includes a metal belt 18' as an example of a guide member instead of the film 18. The metal belt 18' according to the second exemplary embodiment is made of stainless steel (SUS), which is an example of an electrically conductive material and which has an elasticity. The metal belt 18' according to the second exemplary embodiment is electrically grounded or earthed at the second end 18b. As illustrated in FIG. 8B, the metal belt 18' according to the second exemplary embodiment includes a center portion 18c, corresponding to the width of the FFC 17, and a pair of side portions 18d extending from the both edges of the center portion 18c so as to bend over the side edges of the FFC 17. Thus, a bend 19 is formed between the center portion 18c and each side portion 18d.

Function of Scanner Unit U2 According to Second Exemplary Embodiment

Similarly to the scanner unit U2 according to the first exemplary embodiment, in the scanner unit U2 according to the second exemplary embodiment having the above-described configuration, the metal belt 18' has bends 19 in its longitudinally-extending portion, which has a high rigidity. In a portion of the metal belt 18' corresponding to the folded-back portion 17a, the bends 19 are unbent so that the portion is flattened as illustrated in FIG. 8C and follows the shape of the FFC 17. Thus, as in the case of the film 18 according to the first exemplary embodiment, the metal belt 18' according to the second exemplary embodiment is also capable of preventing the FFC 17 from touching the platen glass PG for a long time.

Furthermore, in the second exemplary embodiment, the metal belt 18' is earthed. Thus, the metal belt 18' is capable of preventing the effect of noise of the FFC 17 due to electromagnetic interference (EMI) or the like without the FFC 17 being subjected to shielding. In the second exemplary embodiment, particularly, the metal belt 18' is disposed so as to cover the side edges of the FFC 17, so that the noise from the side edges of the FFC 17 is also capable of being prevented.

Modification Example

Thus far, exemplary embodiments of the invention have been described in detail. However, the invention is not limited to the above-described exemplary embodiments and may be modified in various manners within the gist of the invention described in the scope of claims. The following exemplarily describes modification examples (H01) to (H09) of an exemplary embodiment of the invention.

H01

In the above-described exemplary embodiments, the copying machine U is described as an example of the image forming apparatus. However, the image forming apparatus is not limited to this example and may be a device such as a fax or a multifunctional machine having multiple functions such as the functions of a fax, a printer, and a copying machine. In addition, the image forming apparatus is not limited to an electrophotographic image forming apparatus and may be an image forming apparatus of another type such as a photo-lithographic printer including an inkjet or thermal head printer. Moreover, the image forming apparatus is not limited to a multi-color developing image forming apparatus. The image forming apparatus may be a single-color or monochrome image forming apparatus. In the above-described exemplary embodiments, the scanner unit U2 has been exemplarily described as an example of an image reading device and the configuration where the scanner unit U2 is installed in the copying machine U has been exemplarily described. However, this is not the only configuration. An exemplary embodiment of the invention is also applicable to the configuration of a single body of a scanner.

Figure 9A:
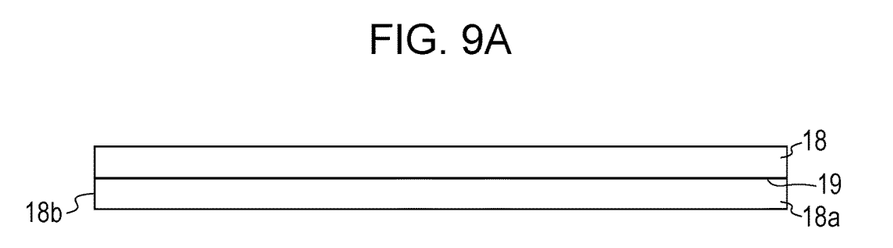
FIG. 9A illustrates a configuration in which a bend extends up to both ends of the guide member and FIG. 9B illustrates a configuration in which a narrow portion is formed at a second end portion of the guide member.
Figure 9B:
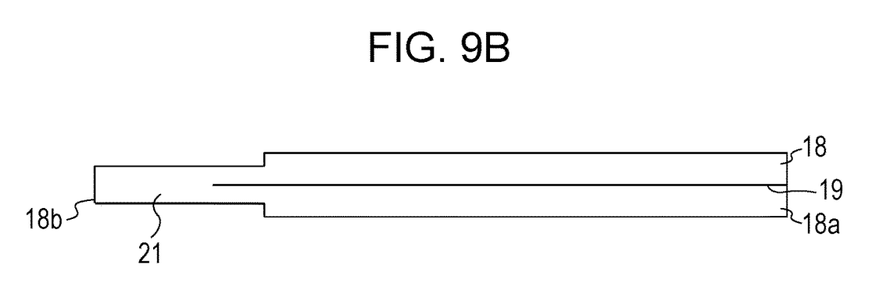

FIG. 9 illustrates modification examples of a guide member, where FIG. 9A illustrates a configuration in which a bend extends up to both ends of the guide member and FIG. 9B illustrates a configuration in which a narrow portion is formed at a second end portion of the guide member.

H02

The exemplary embodiments have exemplarily described the configurations in which each bend 19 does not extend to the other end 18b of the guide member 18 or 18'. However, these are not the only possible configurations. For example, as illustrated in FIG. 9A, each bend 19 may extend up to the other end 18b. Alternatively, each bend 19 may be made shorter or longer in the longitudinal direction than the bends according to the first exemplary embodiment in accordance with the required rigidity.

H03

The exemplary embodiments have exemplarily described the guide members 18 and 18' having a uniform width throughout the longitudinal direction. However, the configuration of the guide member is not limited to this configuration. For example, as illustrated in FIG. 9B, the guide member 18 or 18' may have a narrow portion 21 at a second end portion. Here, a force expanding upward is exerted on the folded-back portion 17a of the FFC 17. Not only on the FFC 17, a force expanding upward is also exerted on the folded-back portion of the guide member 18 or 18'. Thus, in the case where a narrow portion 21 is provided at a portion of the guide member 18 or 18' corresponding to the folded-back portion 17a in the state where the carriage 11 is located in a stand-by position, that is, in a home position, the force that expands the folded-back portion of the guide member 18 or 18' upward is weakened. Thus, compared to the case where the narrow portion 21 is not provided at a portion of the guide member 18 or 18' corresponding to the folded-back portion 17a in the state where the carriage 11 is located in a home position, at which the carriage 11 is located for a longest time period, the FFC 17 and the guide member 18 or 18' are prevented from expanding and are thus less likely to touch the platen glass PG.

Figure 10A:
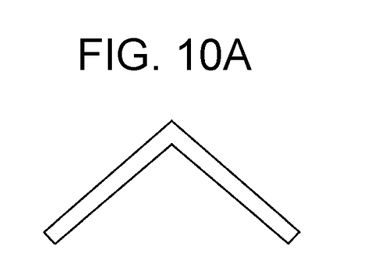
FIG. 10A is a cross-sectional view of a guide member having only one bend.
Figure 10B:
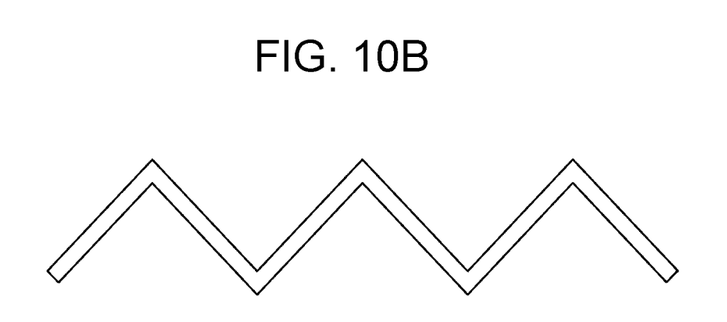
FIG. 10B is a cross-sectional view of a guide member having five bends.
Figure 10C:
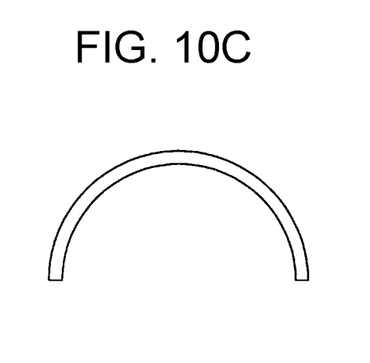
FIG. 10C is a cross-sectional view of a guide member bent into an arc.

FIGS. 10A to 10C illustrate modification examples of a guide member and correspond to FIG. 5B, which is a cross-sectional view of the guide member according to the first exemplary embodiment, where FIG. 10A is a cross-sectional view of a guide member having only one bend, FIG. 10B is a cross-sectional view of a guide member having five bends, and FIG. 10C is a cross-sectional view of a guide member bent into an arc.

H04

In each of the exemplary embodiments, the shapes of the bends 19 of the guide member 18 or 18' are not limited to the shapes described as examples. For example, as illustrated in FIG. 10A and FIG. 10B, the quantity of bends 19 may be increased or decreased. Alternatively, as illustrated in FIG. 10C, the guide member 18 or 18' may dispense with bends 19 and may be entirely bent in the widthwise direction into an arc.

H05

In the exemplary embodiments, specific numerical values or materials described as examples may be appropriately changed in accordance with the design or specifications. Particularly, the material of the guide members 18 and 18' is not limited to PET or SUS, described as examples. For example, resin or metal other than PET or SUS is also usable. The flexural rigidity E·I is also adjustable by adjusting the thickness of the material so that the guide member is deformable following the shape of the FFC 17 or by changing the angle at each bend 19 or the quantity of bends 19 so that the material has a larger second moment of area even though the guide member has a different Young's modulus E.

H06

The exemplary embodiments have exemplarily described the configurations in which the guide member 18 or 18' and the FFC 17 have different lengths in the longitudinal direction. However, these configurations are not the only possible configurations. The guide member 18 or 18' may have a length longer than the length of the guide member according to any of the exemplary embodiments. The exemplary embodiments have exemplarily described the configuration in which both ends of the guide member 18 or 18' are supported by the FFC 17. This is not the only possible configuration, however. Both ends of the guide member 18 or 18' may be respectively supported by the carriage 11 and the bottom surface of the casing 1.

H07

The exemplary embodiments have exemplarily described the configurations in which the light source, the optical system, and the reading member are all supported by the carriage 11. However, this is not the only possible configuration. For example, the light source and the optical system may be supported by the carriage 11 and the reading member may not be supported by the carriage 11.

H08

The exemplary embodiments have exemplarily described the configurations including the auto-feeder U3. The invention is also applicable to the configuration that does not include the auto-feeder U3.

H09

The exemplary embodiments have described configurations in which the guide members 18 and 18' are disposed on the outer side of the FFC 17. However, the guide members 18 and 18' may be disposed on the inner side of the FFC 17.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
    a movable body supported so as to be movable along a support table on which an original document is supported, the movable body supporting at least a light source;
    a controller that controls the light source;
    a connection member that electrically connects the movable body and the controller together, the connection member formed into a strip shape whose longitudinal direction extends in a direction in which the movable body moves and whose lateral direction extends in a widthwise direction that crosses the direction in which the movable body moves, the connection member including a folded-back portion that is folded back in a direction substantially opposite to the direction in which the movable body moves; and
    a guide member disposed along the connection member, the guide member having a high flexural rigidity in a portion that extends along the direction in which the movable body moves, the guide member having a low flexural rigidity in a portion corresponding to the folded-back portion of the connection member,
    wherein the guide member includes a narrow portion disposed corresponding to the folded-back portion of the connection member when the movable body is located at a predetermined stand-by position, the narrow portion having a smaller width than other portions of the guide member.

2. An image reading apparatus, comprising:
    a movable body supported so as to be movable along a support table on which an original document is supported, the movable body supporting at least a light source;
    a controller that controls the light source;
    a connection member that electrically connects the movable body and the controller together, the connection member formed into a strip shape whose longitudinal direction extends in a direction in which the movable body moves and whose lateral direction extends in a widthwise direction that crosses the direction in which the movable body moves, the connection member including a folded-back portion that is folded back in a direction opposite to the direction in which the movable body moves; and a guide member disposed along the connection member, a portion of the guide member being bent with respect to the widthwise direction, the bent portion of the guide member being elastically deformable so as to be flattened in the widthwise direction in a portion corresponding to the folded-back portion of the connection member, wherein the guide member includes a narrow portion disposed corresponding to the folded-back portion of the connection member When the movable body is located at a predetermined stand-by position, the narrow portion having a smaller width than other portions of the guide member.

3. The image reading apparatus according to claim 1, wherein the guide member is electrically grounded and electrically conductive.

4. The image reading apparatus according to claim 2, wherein the guide member is electrically grounded and electrically conductive.

5. An image forming apparatus, comprising:
the image reading apparatus according to claim 1 that reads an image on an original document; and
an image recording unit that records an image on a medium on the basis of the image read by the image reading apparatus.

* * * * *